United States Patent
Liu et al.

(10) Patent No.: US 8,761,480 B2
(45) Date of Patent: Jun. 24, 2014

(54) METHOD AND SYSTEM FOR VASCULAR LANDMARK DETECTION

(75) Inventors: David Liu, Princeton, NJ (US); Shaohua Kevin Zhou, Plainsboro, NJ (US); Dominik Bernhardt, Hausen (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 13/229,953

(22) Filed: Sep. 12, 2011

(65) Prior Publication Data

US 2012/0070053 A1    Mar. 22, 2012

Related U.S. Application Data

(60) Provisional application No. 61/385,231, filed on Sep. 22, 2010.

(51) Int. Cl.
*G06K 9/00* (2006.01)
*G06T 7/00* (2006.01)

(52) U.S. Cl.
CPC ........... *G06K 9/00* (2013.01); *G06T 7/0012* (2013.01); *G06K 2209/05* (2013.01)
USPC .......................................... 382/131

(58) Field of Classification Search
CPC ............ G06T 7/0012; G06T 7/0042; G06T 2207/10072; G06T 2207/10081; G06T 2207/30101; G06K 9/00; G06K 2209/05; G06K 2209/051; A61B 5/489; A61B 6/00; A61B 6/032; A61B 6/504; A61B 6/52; A61B 2019/52; A61B 2019/5289
USPC .......... 382/128, 130, 131; 128/922; 600/407, 600/425, 481
See application file for complete search history.

(56) References Cited

U.S. PATENT DOCUMENTS

| | | | |
|---|---|---|---|
| 2003/0181809 A1 | 9/2003 | Hall et al. | 600/425 |
| 2010/0046815 A1 | 2/2010 | Von Berg et al. | 382/128 |
| 2010/0063389 A1 | 3/2010 | Florent | 600/431 |
| 2010/0189313 A1 | 7/2010 | Prokoski | 382/118 |
| 2010/0191124 A1 | 7/2010 | Prokoski | 600/473 |
| 2010/0191541 A1 | 7/2010 | Prokoski | 705/2 |
| 2010/0254582 A1 | 10/2010 | Liu et al. | 382/131 |

*Primary Examiner* — Andrew W Johns

(57) ABSTRACT

The present invention provides a method and system for vascular landmark detection in CT volumes. A CT volume is received and an initial position of a plurality of vascular landmarks is detected. The initial position of each of the plurality of vascular landmarks is then adjusted in order to position each vascular landmark inside a vessel lumen. A new position of each of the plurality of vascular landmarks representing the adjusted initial positions is output.

42 Claims, 9 Drawing Sheets ated filed Sep. 22, 2010, the disclo-
METHOD AND SYSTEM FOR VASCULAR LANDMARK DETECTION This application claims the benefit of U.S. Provisional Application No. 61/385,231, filed Sep. 22, 2010, the disclosure of which is herein incorporated by reference.

BACKGROUND OF THE INVENTION

The present invention relates to detecting vascular landmarks in computed tomography (CT) volumes.

Accurate placement of vascular landmarks inside the vessel lumen is an important prerequisite to automatic centerline tracing. Although various methods are implemented to determine the location of organ landmarks, several challenges remain for determining the location of vascular landmarks.

Ensuring that the vascular landmarks are placed inside the lumen is challenging when the vessel itself is narrow. Additionally, contrast-enhanced arteries may be tightly surrounded with bones having similar intensity profiles, making detection difficult in comparison with arteries surrounded by darker tissues. Vascular landmarks that are not located at vessel bifurcations may also be difficult to locate since they can be ill-defined due to the high uncertainty of their position. As stated, accurate detection of these vascular landmarks is an important prerequisite to automatic centerline tracing methods requiring humans or machines to indicate start and/or end points of a vessel that is to be traced.

BRIEF SUMMARY OF THE INVENTION

The present invention provides a method and system for vascular landmark detection in CT volumes. A CT volume is received and an initial position of a plurality of vascular landmarks is detected. The initial position of each of the plurality of vascular landmarks is then adjusted in order to position each vascular landmark inside a vessel lumen. A new position of each of the plurality of vascular landmarks representing the adjusted initial positions is output.

In an embodiment, the initial position of each of the plurality of vascular landmarks is adjusted based on whether the initial position is at a vessel bifurcation or not at a vessel bifurcation. In response to determining that the initial position of a vascular landmark is at a vessel bifurcation, a bifurcation response map, vesselness response map, segmentation response map, and skeleton response map are generated. The initial position of a vascular landmark at a vessel bifurcation is adjusted based on these response maps. In response to determining that the initial position of a vascular landmark is not at a vessel bifurcation, a segment of interest is detected using a trained segment detector, and a landmark position within the segment of interest is detected using a trained regression function. To detect the landmark position, spatial features of a response map are computed, a regression model is created based on the spatial features, and a confidence score representing the likelihood of the initial position being inside the lumen is output.

In an embodiment, detecting an initial position of each of a plurality of vascular landmarks may be performed using a greedy algorithm. An anchor landmark is determined using a first trained detector. A search space in the CT volume is determined for each of a plurality of remaining landmarks. A second landmark detection is selected based on the determined search space for each of the plurality of remaining landmarks. All other remaining landmarks are determined on the basis of the detected landmarks by iteratively determining new search spaces and determining a next landmark for detection.

These and other advantages of the invention will be apparent to those of ordinary skill in the art by reference to the following detailed description and the accompanying drawings.

DETAILED DESCRIPTION

The present invention is directed to a method and system for detecting vascular landmarks in computed tomography (CT) volumes. Embodiments of the present invention are described herein to give a visual understanding of the vascular landmark detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
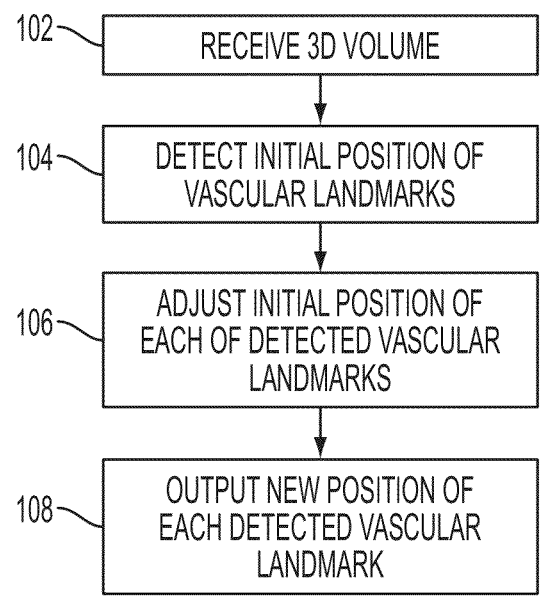
FIG. 1 illustrates a method for detecting vascular landmarks, according to an embodiment of the present invention.

FIG. 1 illustrates a method for detecting vascular landmarks, according to an embodiment of the present invention. At step 102, a 3D volume is received. The 3D volume can be a C-arm CT volume, computed tomography (CT) volume, magnetic resonance imaging (MRI) volume, etc. The 3D volume can be received from an image acquisition device, such as a C-arm image acquisition system, or can be a previously stored volume loaded from memory or storage of a computer system, or some other computer readable medium.

At step 104, an initial position of each of a plurality of vascular landmarks is detected. The initial position of the plurality of vascular landmarks is detected using a plurality of trained landmark detectors, each trained landmark detector trained to detect a vascular landmark. The trained landmark detectors may implement various search strategies in order to detect the initial position of each vascular landmark.

After detection of the initial position of the vascular landmarks, the method proceeds to step 106. At step 106, the initial position of each of the plurality of vascular landmarks is adjusted. Adjustment of the initial position may be required to properly position each vascular landmark inside a vessel lumen. In determining where to adjust the initial position of each vascular landmark, it must first be determined whether a given initial position of a vascular landmark resides at a vessel bifurcation.

Figure 2:
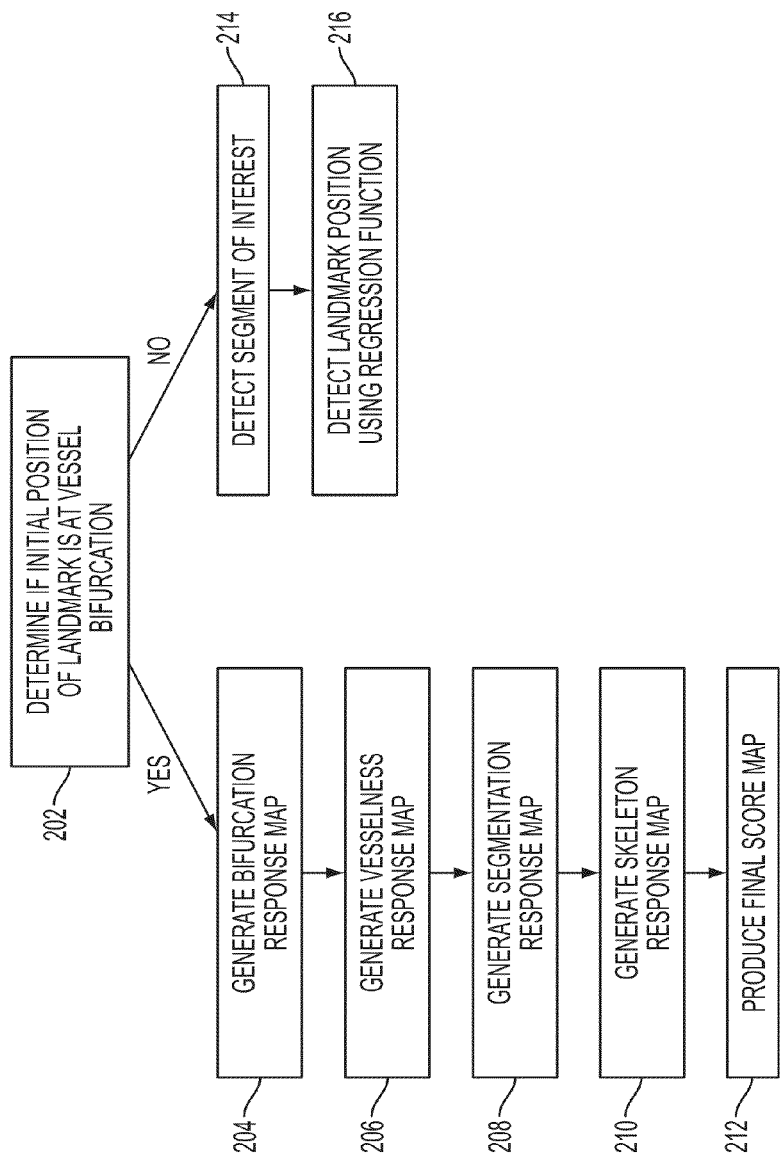
FIG. 2 illustrates a method for adjusting the initial position of the vascular landmarks, according to an embodiment of the present invention.

FIG. 2 illustrates a method for adjusting the initial position of the vascular landmarks including determining whether the initial position of each vascular landmark is at a vessel bifurcation. The method corresponding to FIG. 2 is performed on each of the initial positions corresponding to each detected vascular landmark. At step 202, it is determined whether the initial position of a vascular landmark is at a vessel bifurcation.

If the initial position of a vascular landmark is determined to be at a vessel bifurcation, the method of FIG. 2 proceeds to step 204. Landmarks at vessel bifurcations generally have well-defined positions. For example, the bifurcation of a carotid artery into internal and external carotid arteries properly exemplifies a vessel bifurcation. Another example is the iliac bifurcation. At step 204, a bifurcation response map is generated. The bifurcation response map is generated using a trained bifurcation detector. A bifurcation detector may be trained at multiple resolutions (16, 8, 4, 2 mm) in order to localize a carotid landmark to within approximately 50 mm and generate a bifurcation response map showing the localization. Standard machine learning techniques, such as Ada-Boost and Probabilistic Boosting Tree, with the detection of Haar-like features may be used to localize the carotid landmark. The response map from the bifurcation detector is represented by $R_{bif}$.

At step 206, a vesselness response map is generated. The vesselness response map is generated by a trained vesselness detector. A vesselness detector may be trained using training data including annotated voxels inside the carotid artery from 150 mm below the vessel bifurcation up to the bifurcation. The vesselness detector produces a response map $R_{ves}$ which should have a strong response on an artery within the bifurcation region and a low response above the bifurcation. While the output response map of the vesselness detector does not directly indicate the position of the bifurcation, the appearance variation of the carotid artery varies more significantly above the bifurcation, and hence the vesselness detector detects the part of the artery with fewer variations to give an indication of where the vessel bifurcation is located. Also, once the part of the artery below the bifurcation is detected, this can be used to estimate the grayscale intensity or Hounsfield unit of the artery. The grayscale intensity is utilized by other detectors described below.

At step 208, a segmentation response map is generated. The segmentation response map is generated by a segmentation detector which selects voxels that have grayscale intensity close to the estimated grayscale intensity of the carotid artery. These voxels are used as seeds for initializing a binary segmentation. Graph cuts are used to produce segmentation response map $R_{seg}$. The binary segmentation assigns a binary ON to voxels that belong to the carotid artery, and a binary OFF to the other voxels.

At step 210, a skeleton response map is generated. The skeleton response map is generated by a skeletal detector. A morphological thinning operation generates a skeleton that forks at the carotid artery bifurcation. The estimated position of the carotid bifurcation overlaps the position of the skeleton bifurcation. In order to fuse this estimated position with the other generated response maps, a skeleton response map $R_{ske}$ is generated by assigning a Gaussian-like kernel appearing at the estimated position of the carotid artery bifurcation.

At step 212, after obtaining all of the aforementioned score maps, each response map is weighted and summed to produce a final score map represented as:

$$R = w_{bif}R_{bif} + w_{ves}R_{ves} + w_{seg}R_{seg} + w_{ske}R_{ske} \quad \text{(Eq. 1)}$$

The final score map R consists of multiple modes. For a given landmark of interest L, the mode of the final score map R with the highest score is determined to be $P_L$, which represents the position of the landmark of interest L. The initial position of a vascular landmark is adjusted to a new position represented by $P_L$.

If the initial position of the vascular landmark is determined to not be at a vessel bifurcation, the method of FIG. 2 proceeds to step 214. At step 214, a trained segment detector detects a segment of interest. A vessel segment of interest S is defined as a portion of the vessel where a given landmark of interest L is to be found. Standard machine learning techniques such as AdaBoost and Probabilistic Boosting Trees, together with Haar-like features can be used to train the segment detector.

Figure 3A:
FIGS. 3a-d illustrate examples of response maps generated by a trained segment detector, in accordance with an embodiment of the present invention.
Figure 3B:
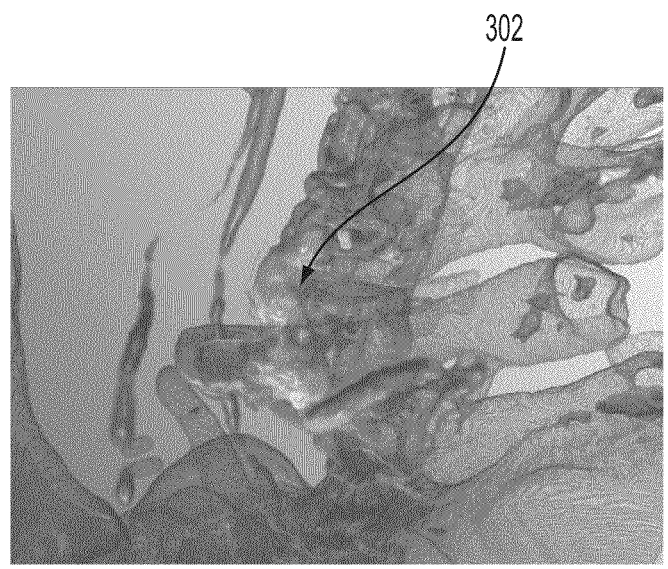
Figure 3C:
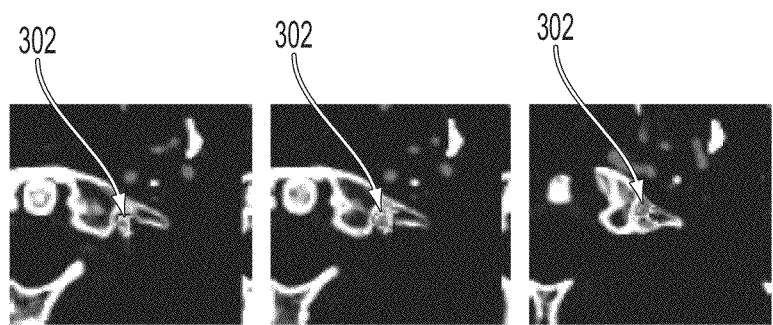
Figure 3D:
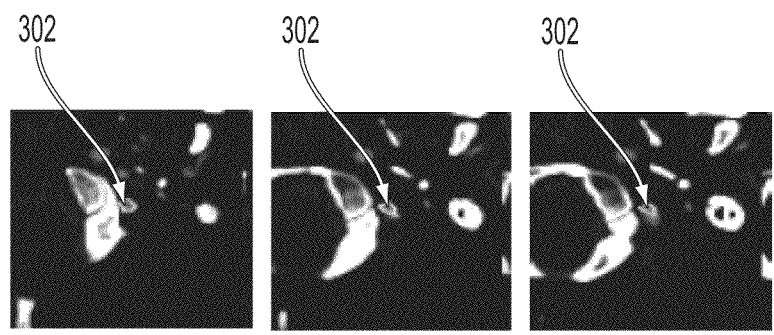

The trained segment detector generates a response map that should generate a greater response at the segment of interest in comparison with other positions. The response could contain two or more peaks. FIGS. 3a-d show examples of response maps generated by the trained segment detector. FIG. 3a shows a segmented vessel segment. FIG. 3b shows response map 302 of the segmented vessel segment. FIG. 3c shows response maps viewed in 2D slices. In FIG. 3c, the response maps 304 are multimodal. FIG. 3d shows the response maps in 2D slices, the response maps 306 being unimodal.

After detecting a segment of interest, the method proceeds to step 216. At step 216, a regression function is applied to the segment of interest to determine a new landmark position for the vascular landmark. The regression function applies a statistical regression model to find a $P_L$, which is the new landmark position that the initial landmark position will be adjusted to. The trained regression function is trained using a set of annotated training data. A multiple linear regression using least squares to fit the ground truth labels from the annotated training data and features of the response map is represented by:

$$y = f(X, \beta) = \beta_1 X_1 + \ldots + \beta_B X_B \quad \text{(Eq. 2)}$$

where β represents the number of features and X represents the features. The voxel position that yields the highest value using the trained regression function is determined as $P_L$.

Figure 4A:
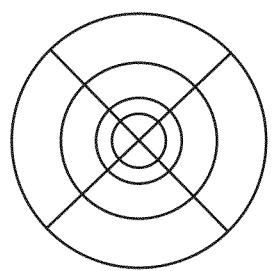
FIGS. 4a-b illustrate examples of spaces used for computing features, in accordance with an embodiment of the present invention.
Figure 4B:
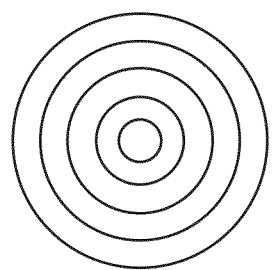

Features are computed around local maxima on response maps along 2D slices. The features record the shape of the response. FIGS. 4a and 4b show examples of spaces used to compute the features. FIG. 4a shows bins divided by log-polar mapping to extract features from response maps. Fib 4b shows bins where radial distance is considered. Each radial bin stores the mean and maximum values of responses from the response map that fall within that particular bin. The detected features are the ones used in the regression function described above.

Thus, to detect the landmark position within the segment of interest using the trained regression function, spatial features of a response map are computed. The response map is generated by the trained segment detector. The regression function is created based upon the computed spatial features. A confidence score is output. The confidence score represents the likelihood that the new landmark position of the vascular landmark is inside the lumen and is used to determine if the initial position should be adjusted to the new landmark position.

Returning to FIG. 1, after step 106 where the initial position of each of the vascular landmarks, the method proceeds to step 108. At step 108, the new position of each of the plurality of vascular landmarks representing the adjusted initial positions is output.

Figure 5:
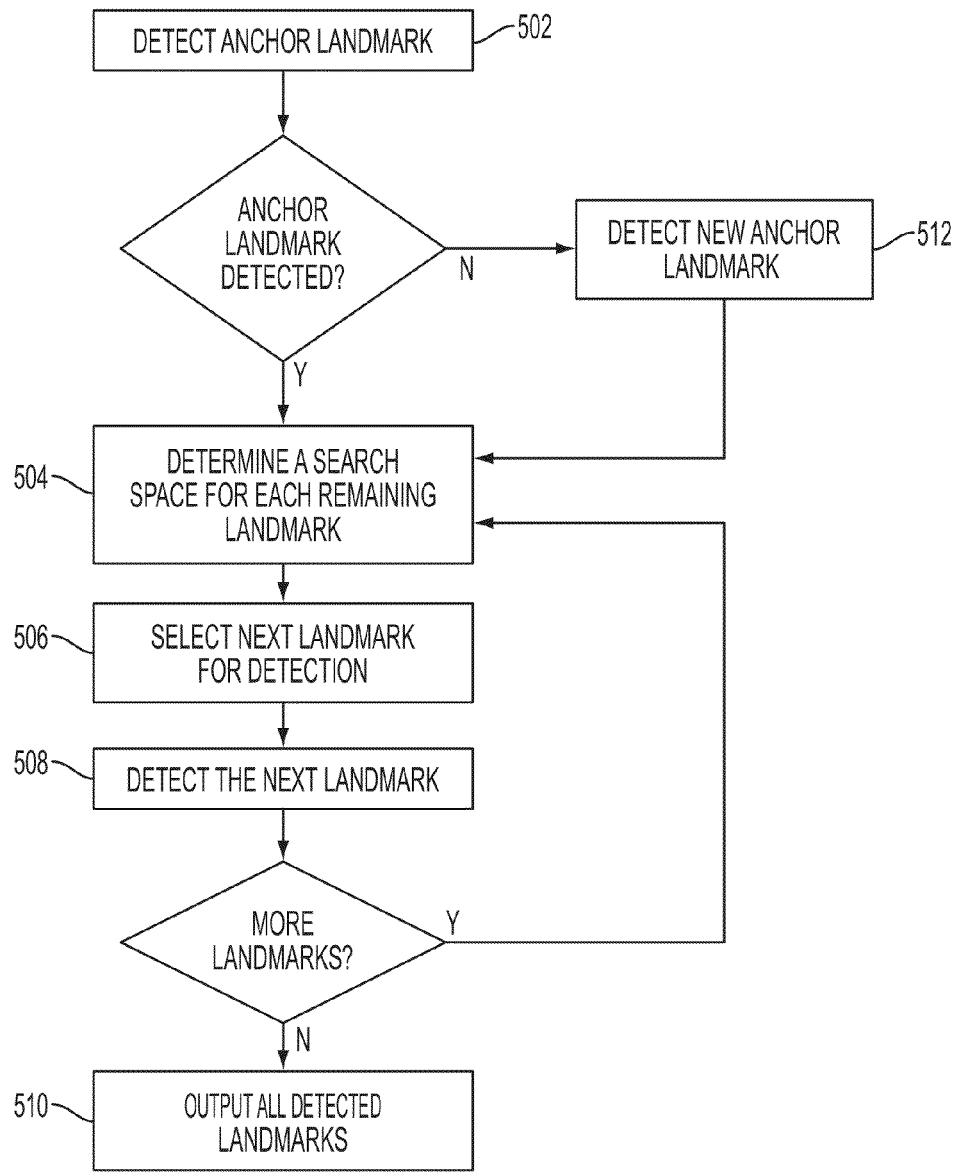
FIG. 5 illustrates a method for detecting an initial position of landmarks in accordance with an embodiment of the present invention.

In an embodiment, detecting the initial position of each of the plurality of vascular landmarks, corresponding to step 104 of FIG. 1 is performed using a method illustrated by FIG. 5. FIG. 5 illustrates a method for detecting an initial position of landmarks, in accordance with an embodiment of the present invention. While the method described herein is used for detecting initial positions of a plurality of vascular landmarks, it is understood by one skilled in the art that this method is applicable to the general detection of any landmark within a 3D volume.

When the relative position of landmarks is constrained, such as vascular landmarks, the search space of the landmarks can be reduced, thereby reducing computational cost. The reduction of computation cost facilitates more efficient determination of landmark positions. The method of FIG. 5 describes the implementation of submodular functions to provide a constant factor approximation guarantee of the optimal speed for landmark detection. Assuming that a plurality of landmark detectors are trained, the method proceeds to step 502.

At step 502, an anchor landmark in the CT volume is detected using a first trained detector. The anchor landmark is denoted by $l_{(1)}$. The anchor landmark represents a first detected landmark, the position of which will be used to help detect any remaining landmarks. The anchor landmark can be a different landmark (or body part) in different images. An ordering of trials representing a priority queue of landmarks sorted by conditional frequency is used for detecting the anchor landmark.

Defining f(l) as the estimated frequency appearance of landmark l in an image, the ordering of trials may be defined as:

$$m_1 = \arg\max_l \{f(l_1), \ldots, f(l_N)\} \quad \text{(Eq. 3)}$$

$$m_1 = \arg\max_l \{f(l_1), \ldots, f(l_N) | m_1 \text{ not present}\} \quad \text{(Eq. 4)}$$

$$m_1 = \arg\max_l \{f(l_1), \ldots, f(l_N) | m_1, m_2 \text{ not present}\} \quad \text{(Eq. 5)}$$

and so on.

Intuitively, since landmark $m_1$ appears most frequently, searching for it in the first trial would most significantly reduce the need for a subsequent trial (whole-image search). Landmark $m_2$ is the most frequent landmark under the condition that $m_1$ does not exist. This conditioning is to avoid $m_2$ being a landmark that is in the vicinity of $m_1$, in which case if $m_1$ is occluded, $m_2$ is also occluded.

Assuming that all trained detectors are uniform and have a similar accuracy and computational cost, the aforementioned ordering can be used. However, if certain trained detectors have a different accuracy or cost than others, those characteristics should be taken into account and may affect the ordering to determine the anchor landmark. Thus, in other embodiments, a different sequential ordering may be used which takes into account the different costs of detectors in order to determine the anchor landmark.

At step 504, a search space in the CT volume is determined for each of the plurality of remaining landmarks. The computational cost of detecting the position of the landmarks is controlled by the size of the image subspace (search space) in which a given detector is performing its search, and the unit cost of each landmark detector. A discussion of determining the search space follows.

Having n landmarks detected, with N−n landmarks remaining to be detected, a determination must be made which landmark to detect and which detector to use. The search space is determined based on the already detected landmarks, the search space being the one whose associated detector has the smallest search space. Theoretical guarantees of this algorithm are discussed below and extending the algorithm to take multiple factors into account, such as the size of the search space and the unit cost of the detector are also described below.

In sequential detection, landmarks that are already detected provide spatial constraints on the landmarks that are still remaining for detection. Consider an object consisting of N distinct landmarks. The ordered set of detected landmarks is represented by:

$$\Lambda_{(1):(n)} = \{l_{(a)} \prec l_{(2)} \prec \ldots \prec l_{(n)}\}, n \leq N \quad \text{(Eq. 6)}$$

The unordered set of landmarks that still remain to be detected is represented by U. For each landmark $l_i \in U$, the search space of each landmark $\Omega_{l_i}$ is determined jointly by landmarks in $\Lambda_{(1):(n)}$, e.g., by the intersection of the individual search spaces, represented by:

$$\Omega_{l_i}(\Lambda_{(1):(n)}) = \bigcap_{j, l_j \in \Lambda_{(1):(n)}} \Omega_{l_i}(\{l_j\}) \quad \text{(Eq. 7)}$$

where $\Omega_{l_i}(\{l_j\})$ denotes the search space for landmark $l_i$ conditioned on the position of a detected landmark $l_j$.

Figure 6:
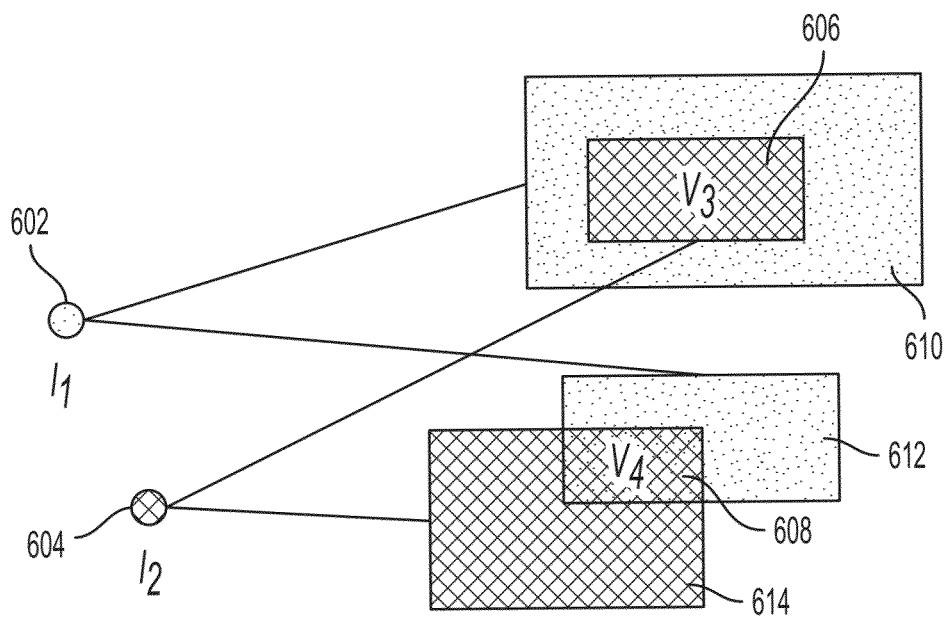
FIG. 6 illustrates search space definition according to the intersection rule, in accordance with an embodiment of the present invention.

FIG. 6 illustrates search space definition as described with respect to Eq. 7 (the intersection-rule), in accordance with an embodiment of the present invention. Detected landmarks 602 and 604 provide search spaces for un-detected landmarks (not shown). Detected landmark 602 provides search spaces 610 and 612. Detected landmark 604 provides search spaces 614 and 606. Final search spaces which contain un-detected landmarks are determined by finding an intersection of search spaces. The final search spaces are search space 606 and search space 608. Note that final search space 606 is the same as search space 606, since search space 606 intersects entirely with search space 610. The greedy algorithm implemented by the method described herein, which will be described in greater detail below, prefers detecting a landmark in search space 608 over a landmark in search space 606 since search space 608 is smaller. The search space criteria used is called the intersection-rule A brief background is necessary before discussing the greedy algorithm. The search volume (or search area) of the search space $\Omega_{l_i}(\Lambda)$ is represented as $V(\Omega_{l_i}(\Lambda))$, which calculates the volume of $\Omega_{l_i}(\Lambda)$. Without loss of generality, assuming the search volume is the cardinality of the set of voxels (pixels) that fall within the search space, a constant $\Omega_\phi = \Omega_k(\phi), \forall k$ is defined, as the space of the whole image, which is a tight upper bound of the search space. The search volume itself will have a property represented by the following theorem:

$$\forall S \subseteq T, V(\Omega(S)) - V(\Omega(S \cup \{l\})) \geq V(\Omega(T)) - V(\Omega(T \cup \{l\})) \quad \text{(Eq. 8)}$$

The goal is to find the ordered set $\Lambda_{(2):(N)}$ that minimizes the cumulative search volume:

$$\Lambda'_{(2):(N)} = \underset{\Lambda_{(2):(N)}}{\arg\min} \sum_{i=2}^{N} V(\Omega_{l_{(i)}}(\Lambda_{(1):(i-1)})) \quad \text{(Eq. 9)}$$

The following paragraphs describe the greedy algorithm used for determining the search space in the CT volume for each of the plurality of remaining landmarks. A cost function can be defined as: $C_k(\Lambda)=V(\Omega_k(\Lambda)), \forall k$. The greedy algorithm for finding an ordering $\{l_{(1)}, \ldots, l_{(N)}\}$ is represented by the following algorithm:
Initialize $\Lambda=\{l_{(1)}\}$
For j=2, ..., N do
  $l_{(j)}=\arg\min_k C_k(\Lambda_{(1):(j-1)})$
  Append $l_{(j)}$ the ordered set $\Lambda_{(1):(j-1)}$
End The greedy algorithm attempts to minimize the overall cost. In each round, a detector yields the smallest cost is selected to determine the next landmark for detection. For example, the detector with the smallest cost may be associated with a landmark having the smallest search space, and thus this landmark will be chosen as the next landmark for detection using the aforementioned detector with the smallest cost.

The theoretical properties of the greedy algorithm is now discussed. Defining:

$$F_k(\Lambda)=C_k(\phi)-C_k(\Lambda) \qquad \text{(Eq. 10)}$$

$F_k(\phi)=0$ and $F_k(\bullet)$ is a nondecreasing set function. From Eq. 6 and Eq. 10, $\forall S \subseteq T$, $$F_k(S)-F_k(S\cup\{l\}) \leq F_k(T)-F_k(T\cup\{l\}) \qquad \text{(Eq. 11)}$$

which means $F_k(\bullet)$ is a submodular function. Furthermore, as $C_k(\phi)$ is constant over k, Eq. 9 becomes:

$$\Lambda'_{(2):(N)} = \underset{\Lambda_{(2):(N)}}{\arg\max} \sum_{k=2}^{N} F_k(\Lambda_{(1):(k-1)}) \qquad \text{(Eq. 12)}$$

$F(\bullet)=\Sigma F_k(\bullet)$ is submodular if $\forall k$, $F_k(\bullet)$ is submodular. These properties support the theoretical guarantee of the greedy algorithm: If $F(\bullet)$ is a submodular, nondecreasing set function and $F_k(\phi)=0$, then the greedy algorithm finds a set $\Lambda'$, such that $F(\Lambda') \geq (1-1/e)\max F(\Lambda)$.

The greedy algorithm is guaranteed to find an ordered set $\Lambda$ such that $F(\bullet)$ reaches at least 63% of the optimal value. The ordering of landmarks to be detected is image-dependent, since the search space of the next detector is always dependent on the position of already detected landmarks. In addition, when the search space of a landmark is outside the image or if its detection score is too low, this landmark is claimed missing and will influence subsequent detectors through the definition of the search space and affect the final ordering.

Another useful definition of search space can be defined as follows:

$$\Omega_{l_i}(\Lambda) = \min_{l \in \Lambda}\{\Omega_{l_i}(l)\} \qquad \text{(Eq. 13)}$$

In each round of the greedy algorithm, each detected landmark provides a search space candidate for each undetected landmark. The undetected landmark with the smallest search space is selected as the next landmark to be detected.

Figure 7:
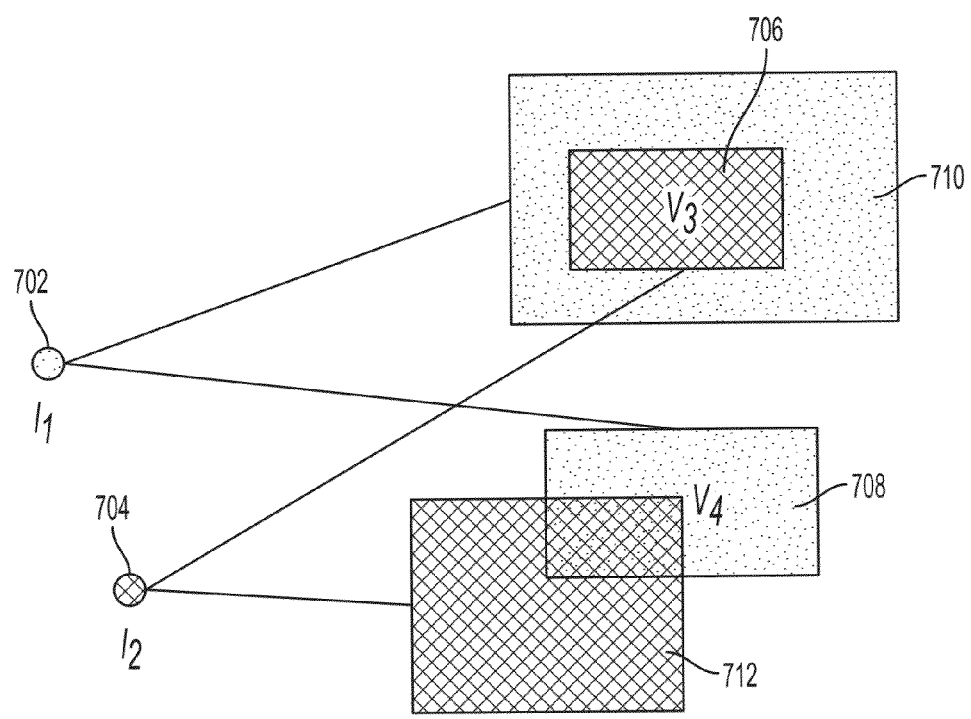
FIG. 7 illustrates search space definition according to the min-rule, in accordance with an embodiment of the present invention.

FIG. 7 illustrates search space definition as described with respect to Eq. 8 (min-rule), in accordance with an embodiment of the present invention. Detected landmarks 702 and 704 provide search spaces for un-detected landmarks (not shown). Detected landmark 702 provides search spaces 710 and 708. Detected landmark 704 provides search spaces 706 and 712. Final search spaces corresponding to the un-detected landmarks are determined and represent minimum sets. The final search spaces are search space 706 and search space 708.

In this illustration, the greedy algorithm incorporates a min rule and prefers detecting the landmark in search space 706 since search space 706 is smaller than search space 708.

As discussed above, the greedy algorithm considers search space intersections or size to determine which landmark to detect next. However, in practice, different detectors may have different associated costs which should be taken into account during optimization. For example, if there are two detectors, the greedy algorithm would typically select the next detector with the smallest search space to detect the next undetected landmark. However, the selected detector may have a higher unit computational cost than other detectors.

In order to take into account the unit computational cost, the search volume can be multiplied by the unit computational cost, since a detector is applied to each voxel within the search space. Denoting $q_i$ as the computational unit cost of detector i, the product $q_i C(\Omega_{l_i}(\Lambda))$ considers the joint computational cost. Since $\forall i, q_i \geq 0, q_i C(\Omega_{l_i}(\Lambda))$ is submodular, the greedy algorithm can be applied.

Thus, in determining the search space for each of the plurality of remaining landmarks, the greedy algorithm sequentially orders a plurality of detectors, each detector associated with a respective search space, and each search space including a landmark to be detected.

Returning to FIG. 5, after determining the search space, the method proceeds to step 506. At step 506, a second landmark is selected for detection based on the determined search space of each of the plurality of remaining landmarks. The landmark selected for detection corresponds with the top detector in the sequential ordering determined by the greedy algorithm.

At step 508, the second landmark in the CT volume is detected using a second trained detector. The second trained detector is a detector associated with the determined search space.

If there are further landmarks to be detected, the method proceeds back to step 504 to determine a new search space for each of the plurality of remaining landmarks. The method proceeds from step 504 through 508 in order to detect each of the remaining landmarks.

Once all landmarks have been detected, the method proceeds to step 510, where all detected landmarks are output as detection results in response to a determination that all landmarks have been detected.

In the event that the anchor landmark detected at step 502 is insufficient, by failing to meet a predetermined threshold, the method may proceed to step 512 to detect a new anchor landmark in response to this determination that the detected anchor landmark fails to meet the predetermined threshold. Additionally, a new anchor landmark may need to be chosen if no subsequent landmarks are found using the detected anchor landmark.

In an embodiment, the greedy algorithm described above is run using coarsest-resolution detectors. A local (small) search space can be defined around each detected landmark and hither resolution detectors can be used within the local search space. The posterior probability of position x is taken from all resolutions using a log-linear model:

$$p(x|I_{r_1}, \ldots, I_{r_R}) \alpha \exp(\Sigma_{i=1}^{R} \alpha_{r_i} \phi_{r_i}(x)) \qquad \text{(Eq. 13)}$$

where $I_{r_i}$ is the volume at resolution $r_i$, $p(x|I_{r_i})$ is the posterior probability from the detector with resolution $r_i$, and the potential functions are given by $\phi_{r_i}(x)=\log p(x|I_{r_i})$.

The posterior probability position x can also be taken from all resolutions using the mixture-of-experts model:

$$p(x|I_{r_1}, \ldots, I_{r_R}) \alpha \Sigma_{i=1}^{R} \alpha_{r_i} p(x|I_{r_i}) \qquad \text{(Eq. 14)}$$

While the log-linear model corresponding to Eq. 13 (also a products-of-experts model) tends to produce sharper classification boundaries, the mixture-of-experts model tents to have a higher tolerance to poor probability estimates.

While the method of FIG. 5 is described herein with respect to detecting an initial position of a plurality of vascular landmarks, it is understood by one skilled in the art that the method of FIG. 5 can be applied to any type of landmarks.

Figure 8:
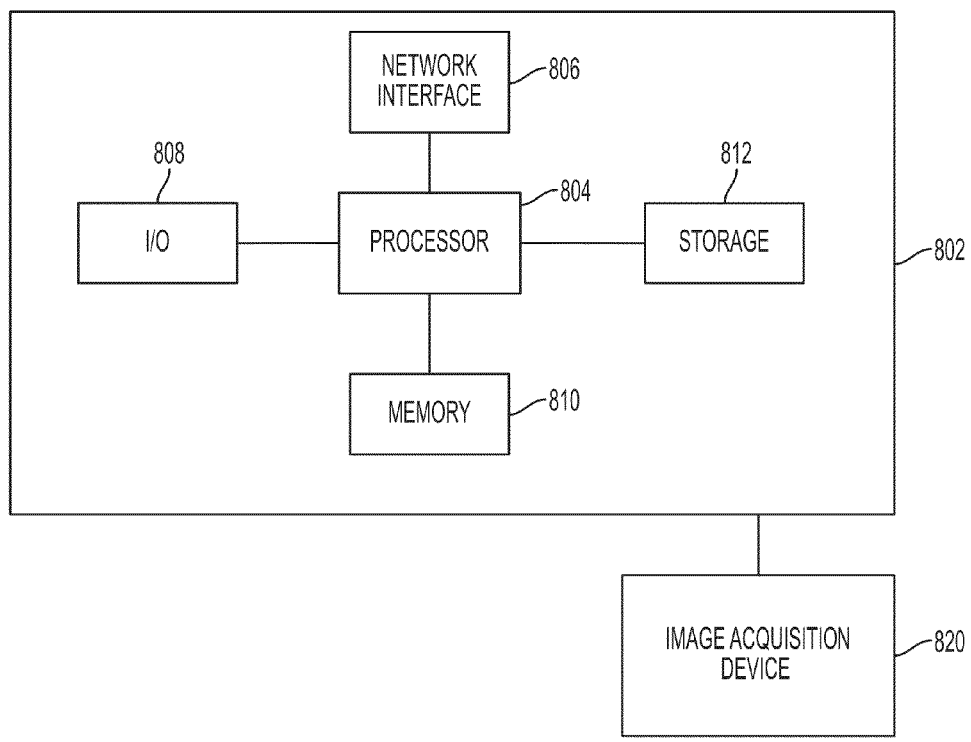
FIG. 8 is a high level block diagram of a computer capable of implementing the present invention.

The above-described methods for vascular landmark detection in a 3D volume, may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.) and loaded into memory 810 when execution of the computer program instructions is desired. Thus, the steps of the methods of FIGS. 2 and 5 may be defined by the computer program instructions stored in the memory 910 and/or storage 812 and controlled by the processor 804 executing the computer program instructions. An image acquisition device 820 can be connected to the computer 802 to input images to the computer 802. For example the image acquisition device 820 may be a C-arm image acquisition system capable of inputting 3D C-arm CT images and 2D fluoroscopic images to the computer 802. It is possible to implement the image acquisition device 820 and the computer 802 as one device. It is also possible that the image acquisition device 820 and the computer 802 communicate wirelessly through a network. The computer 802 also includes one or more network interfaces 806 for communicating with other devices via a network. The computer 802 also includes other input/output devices 908 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting vascular landmarks in a computerized tomography (CT) volume comprising:
   receiving a CT volume;
   detecting an initial position of each of a plurality of vascular landmarks;
   adjusting the initial position of each of the plurality of vascular landmarks to position each vascular landmark inside a vessel lumen; and
   outputting a new position of each of the plurality of vascular landmarks representing the adjusted initial positions.

2. The method of claim 1, wherein adjusting the initial position of each of the plurality of vascular landmarks comprises:
   determining whether the initial position of each of the plurality of vascular landmarks is at a vessel bifurcation.

3. The method of claim 2, further comprising:
   in response to determining that the initial position of a vascular landmark is at a vessel bifurcation:
      generating a bifurcation response map;
      generating a vesselness response map;
      generating a segmentation response map; and
      generating a skeleton response map.

4. The method of claim 3, further comprising:
   adjusting the initial position of a vascular landmark at the vessel bifurcation based on the bifurcation response map, vesselness response map, segmentation response map, and skeleton response map.

5. The method of claim 2, further comprising:
   in response to determining that the initial position of a vascular landmark is not at the vessel bifurcation:
      detecting a segment of interest using a trained segment detector; and
      detecting a landmark position within the segment of interest using a trained regression function.

6. The method of claim 5, wherein detecting a landmark position within the segment of interest using a trained regression function comprises:
   computing spatial features of a response map generated by the trained segment detector;
   creating a regression model based on the spatial features; and
   outputting a confidence score representing the likelihood of the initial position being inside the lumen.

7. The method of claim 1, wherein detecting an initial position of each of a plurality of vascular landmarks comprises:
   detecting an anchor landmark in the CT volume using a first trained detector;
   determining a search space in the CT volume for each of a plurality of remaining landmarks;
   selecting a second landmark for detection based on the determined search space for each of the plurality of remaining landmarks; and
   detecting the second landmark in the CT volume using a second trained detector.

8. The method of claim 7, further comprising:
   detecting a new anchor landmark in the CT volume in response to a determination that the detected anchor landmark fails to meet a predetermined threshold.

9. The method of claim 7, further comprising:
   determining a new search space in the CT volume for each of the plurality of remaining landmarks after detection of the second landmark;
   selecting a third landmark for detection based on the new search space of each of the plurality of remaining landmarks; and
   detecting the third landmark in the CT volume using a third trained detector.

10. The method of claim 7, further comprising:
    outputting detection results in response to determining that all search spaces have been searched.

11. The method of claim 7, wherein selecting a second landmark for detection comprises:
    sequentially ordering the plurality of remaining detectors, each of the plurality of remaining detectors associated with a respective search space containing a landmark.

12. The method of claim 11, wherein sequentially ordering the plurality of remaining detectors is based on a search space size of each of the plurality of remaining landmarks.

13. The method of claim 11, wherein sequentially ordering the plurality of remaining detectors is based on a cost associated with each of the plurality of detectors.

14. The method of claim 7, wherein determining a search space in the CT volume for each of a plurality of remaining landmarks is based upon spatial constraints set by the detected anchor landmark.

15. An apparatus for detecting vascular landmarks in a computerized tomography (CT) volume comprising:
    means for receiving a CT volume;
    means for detecting an initial position of each of a plurality of vascular landmarks;
    means for adjusting the initial position of each of the plurality of vascular landmarks to position each vascular landmark inside a vessel lumen; and
    means for outputting a new position of each of the plurality of vascular landmarks representing the adjusted initial positions.

16. The apparatus of claim 15, wherein means for adjusting the initial position of each of the plurality of vascular landmarks comprises:
    means for determining whether the initial position of each of the plurality of vascular landmarks is at a vessel bifurcation.

17. The apparatus of claim 16, further comprising:
    means for determining that the initial position of a vascular landmark is at a vessel bifurcation;
    means for generating a bifurcation response map;
    means for generating a vesselness response map;
    means for generating a segmentation response map; and
    means for generating a skeleton response map.

18. The apparatus of claim 17, further comprising:
    means for adjusting the initial position of a vascular landmark at the vessel bifurcation based on the bifurcation response map, vesselness response map, segmentation response map, and skeleton response map.

19. The apparatus of claim 16, further comprising:
    means for determining that the initial position of a vascular landmark is not at the vessel bifurcation;
    means for detecting a segment of interest using a trained segment detector; and
    means for detecting a landmark position within the segment of interest using a trained regression function.

20. The apparatus of claim 19, wherein means for detecting a landmark position within the segment of interest using a trained regression function comprises:
    means for computing spatial features of a response map generated by the trained segment detector;
    means for creating a regression model based on the spatial features; and
    means for outputting a confidence score representing the likelihood of the initial position being inside the lumen.

21. The apparatus of claim 15, wherein means for detecting an initial position of each of a plurality of vascular landmarks comprises:
    means for detecting an anchor landmark in the CT volume using a first trained detector;
    means for determining a search space in the CT volume for each of a plurality of remaining landmarks;
    means for selecting a second landmark for detection based on the determined search space for each of the plurality of remaining landmarks; and
    means for detecting the second landmark in the CT volume using a second trained detector.

22. The apparatus of claim 21, further comprising:
    means for detecting a new anchor landmark in the CT volume in response to a determination that the detected anchor landmark fails to meet a predetermined threshold.

23. The apparatus of claim 21, further comprising:
    means for determining a new search space in the CT volume for each of the plurality of remaining landmarks after detection of the second landmark;
    means for selecting a third landmark for detection based on the new search space of each of the plurality of remaining landmarks; and
    means for detecting the third landmark in the CT volume using a third trained detector.

24. The apparatus of claim 21, further comprising:
    means for outputting detection results in response to determining that all search spaces have been searched.

25. The apparatus of claim 21, wherein means for selecting a second landmark for detection comprises:
    means for sequentially ordering the plurality of remaining detectors, each of the plurality of remaining detectors associated with a respective search space containing a landmark.

26. The apparatus of claim 25, further comprising:
    means for sequentially ordering the plurality of remaining detectors based on a search space size of each of the plurality of remaining landmarks.

27. The apparatus of claim 25, further comprising:
    means for sequentially ordering the plurality of remaining detectors based on a cost associated with each of the plurality of detectors.

28. The method of claim 21, further comprising:
    means for determining a search space in the CT volume for each of a plurality of remaining landmarks based upon spatial constraints set by the detected anchor landmark.

29. A non-transitory computer readable medium encoded with computer executable instructions for detecting vascular landmarks in a computerized tomography (CT) volume, the computer executable instructions defining steps comprising:
    receiving a CT volume;
    detecting an initial position of each of a plurality of vascular landmarks;
    adjusting the initial position of each of the plurality of vascular landmarks to position each vascular landmark inside a vessel lumen; and
    outputting a new position of each of the plurality of vascular landmarks representing the adjusted initial positions.

30. The computer readable medium of claim 29, wherein the computer executable instructions defining the step of adjusting the initial position of each of the plurality of vascular landmarks comprises computer executable instructions defining the step of:
    determining whether the initial position of each of the plurality of vascular landmarks is at a vessel bifurcation.

31. The computer readable medium of claim 30, further comprising computer executable instructions defining the steps of:
    in response to determining that the initial position of a vascular landmark is at a vessel bifurcation:
        generating a bifurcation response map;
        generating a vesselness response map;
        generating a segmentation response map; and
        generating a skeleton response map.

32. The computer readable medium of claim 31, further comprising computer executable instructions defining the steps of:
    adjusting the initial position of a vascular landmark at the vessel bifurcation based on the bifurcation response map, vesselness response map, segmentation response map, and skeleton response map.

33. The computer readable medium of claim 30, further comprising computer executable instructions defining the steps of:
  in response to determining that the initial position of a vascular landmark is not at the vessel bifurcation:
    detecting a segment of interest using a trained segment detector; and
    detecting a landmark position within the segment of interest using a trained regression function.

34. The computer readable medium of claim 33, wherein the computer executable instructions defining the step of detecting a landmark position within the segment of interest using a trained regression function comprises computer executable instructions defining the steps of:
  computing spatial features of a response map generated by the trained segment detector;
  creating a regression model based on the spatial features; and
  outputting a confidence score representing the likelihood of the initial position being inside the lumen.

35. The computer readable medium of claim 29, wherein the computer executable instructions defining the step of detecting an initial position of each of a plurality of vascular landmarks comprises computer executable instructions defining the steps of:
  detecting an anchor landmark in the CT volume using a first trained detector;
  determining a search space in the CT volume for each of a plurality of remaining landmarks;
  selecting a second landmark for detection based on the determined search space for each of the plurality of remaining landmarks; and
  detecting the second landmark in the CT volume using a second trained detector.

36. The computer readable medium of claim 35, further comprising computer executable instructions defining the step of:
  detecting a new anchor landmark in the CT volume in response to a determination that the detected anchor landmark fails to meet a predetermined threshold.

37. The computer readable medium of claim 35, further comprising computer executable instructions defining the steps of:
  determining a new search space in the CT volume for each of the plurality of remaining landmarks after detection of the second landmark;
  selecting a third landmark for detection based on the new search space of each of the plurality of remaining landmarks; and
  detecting the third landmark in the CT volume using a third trained detector.

38. The computer readable medium of claim 35, further comprising computer executable instructions defining the step of:
  outputting detection results in response to determining that all search spaces have been searched.

39. The computer readable medium of claim 35, wherein the computer executable instructions defining the step of selecting a second landmark for detection comprises computer executable instructions defining the step of:
  sequentially ordering the plurality of remaining detectors, each of the plurality of remaining detectors associated with a respective search space containing a landmark.

40. The computer readable medium of claim 39, wherein sequentially ordering the plurality of remaining detectors is based on a search space size of each of the plurality of remaining landmarks.

41. The computer readable medium of claim 39, wherein sequentially ordering the plurality of remaining detectors is based on a cost associated with each of the plurality of detectors.

42. The computer readable medium of claim 35, wherein determining a search space in the CT volume for each of a plurality of remaining landmarks is based upon spatial constraints set by the detected anchor landmark.

* * * * *